United States Patent
Nachum

(10) Patent No.: US 9,703,338 B1
(45) Date of Patent: Jul. 11, 2017

(54) POWER OVER ETHERNET BY 802.1X USER AUTHENTICATE PROTOCOL

(71) Applicant: Marvell International Ltd., Hamilton (BM)

(72) Inventor: Gai Nachum, Tel Aviv (IL)

(73) Assignee: MARVELL INTERNATIONAL LTD, Hamilton (BM)

( * ) Notice: Subject to any disclaimer, the term of this patent is extended or adjusted under 35 U.S.C. 154(b) by 401 days.

(21) Appl. No.: 13/864,870

(22) Filed: Apr. 17, 2013

Related U.S. Application Data

(60) Provisional application No. 61/625,606, filed on Apr. 17, 2012.

(51) Int. Cl.
   *G06F 1/00*   (2006.01)
   *G06F 1/26*   (2006.01)

(52) U.S. Cl.
   CPC ..................... *G06F 1/26* (2013.01)

(58) Field of Classification Search
   CPC ........................................................ G06F 1/26
   See application file for complete search history.

(56) References Cited

U.S. PATENT DOCUMENTS

| | | | | |
|---|---|---|---|---|
| 7,472,290 B2 * | 12/2008 | Diab et al. | ..................... | 713/300 |
| 8,082,457 B2 * | 12/2011 | Randall | ................. | G06F 1/3203 |
| | | | | 713/300 |
| 8,370,656 B2 * | 2/2013 | Gupta | ........................... | 713/300 |
| 8,392,964 B2 * | 3/2013 | Diab | ....................... | G06F 1/266 |
| | | | | 726/2 |
| 2007/0135086 A1 * | 6/2007 | Stanford | ................. | H04L 12/10 |
| | | | | 455/402 |
| 2007/0296394 A1 * | 12/2007 | Landry | ................... | H04L 12/10 |
| | | | | 323/371 |
| 2008/0052546 A1 * | 2/2008 | Schindler | ............... | G06F 1/266 |
| | | | | 713/300 |
| 2008/0215902 A1 * | 9/2008 | Jonnala | ..................... | G06F 1/28 |
| | | | | 713/320 |
| 2008/0256598 A1 * | 10/2008 | Diab | ....................... | G06F 1/266 |
| | | | | 726/2 |
| 2009/0070603 A1 * | 3/2009 | Diab | ................ | H04L 12/40045 |
| | | | | 713/300 |
| 2009/0228722 A1 * | 9/2009 | Lin | ........................ | H04L 12/10 |
| | | | | 713/300 |
| 2010/0199113 A1 * | 8/2010 | Lee | ......................... | G06F 1/266 |
| | | | | 713/300 |
| 2014/0129855 A1 * | 5/2014 | Hamdi | .................... | G06F 1/266 |
| | | | | 713/320 |

OTHER PUBLICATIONS 802.11, "IEEE Standard for Information technology—Telecommunications and information exchange between systems—Local and metropolitan area networks—Specific requirements", Part 11: Wireless LAN Medium Access Control (MAC) and Physical Layer (PHY) Specifications, IEEE Computer Society, Jun. 12, 2007, 1232 pages.

* cited by examiner

*Primary Examiner* — Mohammed Rehman

(57) ABSTRACT

A Power-over-Ethernet (PoE) switch selectively controls the supply of power to the PoE output ports on a user-specific basis, based on a network port authentication protocol. The PoE switch includes an accounting information unit storing power usage information on a per-user basis. The PoE switch uses a protocol such as the 802.1x network port authentication protocol.

18 Claims, 5 Drawing Sheets

POWER OVER ETHERNET BY 802.1X USER AUTHENTICATE PROTOCOL

CROSS-REFERENCE TO RELATED APPLICATION

Priority is claimed from U.S. Provisional Patent Application No. 61/625,606 filed on Apr. 17, 2012; the entire contents of which are incorporated herein in their entirety by this reference.

BACKGROUND

Field

The current disclosure relates to Power-over-Ethernet (PoE) network equipment, and more specifically to PoE network equipment configured to selectively supply power to devices in a network.

Description of Related Art

The background information provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Conventionally, electronic devices using Ethernet cables to transfer data use a separate, dedicated power supply from a DC or AC source. Power-over-Ethernet (PoE) is an emerging standard that provides for supplying power to the electronic device over the Ethernet cable itself, which is simultaneously being used to transfer data, thus eliminating the need for a dedicated power supply. The benefits of PoE have been gaining recognition in the networking and telecommunication industry. Among the benefits of PoE are a reduced need for accessories such as a power cable, and the ability to transfer power over long distances via Ethernet cable, as opposed to the relatively short distance over which Universal Serial Bus (USB) can supply power.

In conventional PoE network equipment, such as a PoE Switch, the power is typically supplied to the connected device alongside data, without any control over the amount of power distribution to different devices. For example, current standards do not provide for any user-focused power distribution control, so the network provider is unable to approve, deny, or account for power provided to different users.

SUMMARY

According to an example embodiment, a switch includes a plurality of power over Ethernet (PoE) output ports, including a first PoE output port and a second PoE output port; and a controller, coupled to the plurality of PoE output ports, and responsive to a network authentication protocol, the controller being configured to selectively control the plurality of PoE output ports to provide a first level of power to a first device coupled to the first PoE output port, and to provide a second level of power, to a second device coupled to the second PoE output port based on an authentication according to the network authentication protocol.

According to another example embodiment, the switch includes a power supply; the controller includes a processor core configured to generate a configuration instruction based on user authentication information, authenticated via the network authentication protocol; and a port power controller configured to distribute power from the power supply among the plurality of PoE output ports in accordance with the configuration instruction from the processor core.

According to another example embodiment, the first level of power is different from the second level of power.

According to another example embodiment, the first level of power is the same as the second level of power.

According to another example embodiment, the switch includes a communication unit configured to communicate the user authentication information to an external server using Extensible Authentication Protocol (EAP).

According to another example embodiment, the controller is responsive to IEEE 802.1x network authentication protocol; and the controller operates in compliance with IEEE 802.3af.

According to another example embodiment, the switch includes an authentication engine; the processor core is configured to process the user authentication information, including a PoE attribute, received from the authentication engine; and the processor core is configured to generate the configuration instruction based on the PoE attribute.

According to another example embodiment, the processor core is configured to generate the configuration instruction based also on a power-related requirement of the first device; and the port power controller is configured to selectively provide the first level of power to the first device based on the power related requirement of the first device, and to selectively provide the second level of power to the second device based on the power related requirement of the second device.

According to another example embodiment, the processor core is configured to generate a configuration instruction that causes the port power controller to distribute power, from the power supply, to the plurality of PoE output ports, according to a prioritization scheme that prioritizes providing power to those PoE output ports which are coupled to devices associated with an authorized user.

According to another example embodiment, the user authentication information includes an authentication decision; and when a given port of the plurality of PoE output ports is receiving power and the authentication decision for the given port is not affirmative, the processor core generates a configuration instruction causing the port power controller to stop distributing power from the power supply to the given port.

According to another example embodiment, the switch includes an accounting information unit configured to store power usage information on a per-user basis.

According to an example embodiment, a switch, includes a plurality of power over Ethernet (PoE) output ports that are configured to supply power to a device that is coupled to one of the PoE output ports; and a controller, that is responsive to a network authentication protocol, coupled to the PoE output ports and configured to selectively control the supply of power to the PoE output ports based on the network authentication protocol.

According to another example embodiment, the responsiveness of the controller to the network authentication protocol is implemented by the controller by responding to an instruction based on the network authentication protocol.

According to another example embodiment, a method for providing a level of power from a Power over Ethernet (PoE) output port includes detecting a connection of an electronic device at the PoE output port; receiving user identification information via the PoE output port; making a determination, as to a level of power to be supplied to the electronic device over the PoE output port, using the user identification information; and supplying power, from the PoE output port, to the electronic device, based on the determination.

According to another example embodiment, making the determination comprises authenticating a user associated with the electronic device by user identification information, and determining the level of power to be supplied taking into account an authentication decision based on the user identification information.

According to another example embodiment, determining a level of power to be supplied over the PoE output port is based on a PoE attribute associated with the user identification information.

According to another example embodiment, determining a level of power to be supplied over the PoE output port comprises determining a first level of power to be supplied to a first port and determining a second level of power, different from the first level of power, to be supplied to a second port.

According to another example embodiment, when the authentication decision is not affirmative, the level of power supplied to the PoE output port is substantially no power.

According to another example embodiment, the method includes making a record of power provided over the PoE output port, in accordance with the user identification information so that power usage records are made on a per-user basis.

DETAILED DESCRIPTION

Embodiments will be described below in more detail with reference to the accompanying drawings. The following detailed descriptions are provided to assist the reader in gaining a comprehensive understanding of the methods, apparatuses, and/or systems described herein and equivalent modifications thereof. Accordingly, various changes, modifications, and equivalents of the methods, apparatuses, and/ or systems described herein will be apparent to those of ordinary skill in the art. Moreover, descriptions of well-known functions and constructions may be omitted for increased clarity and conciseness.

The terms used in the description are intended to describe embodiments only, and shall by no means be restrictive. Unless clearly used otherwise, expressions in a singular from include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Figure 1:
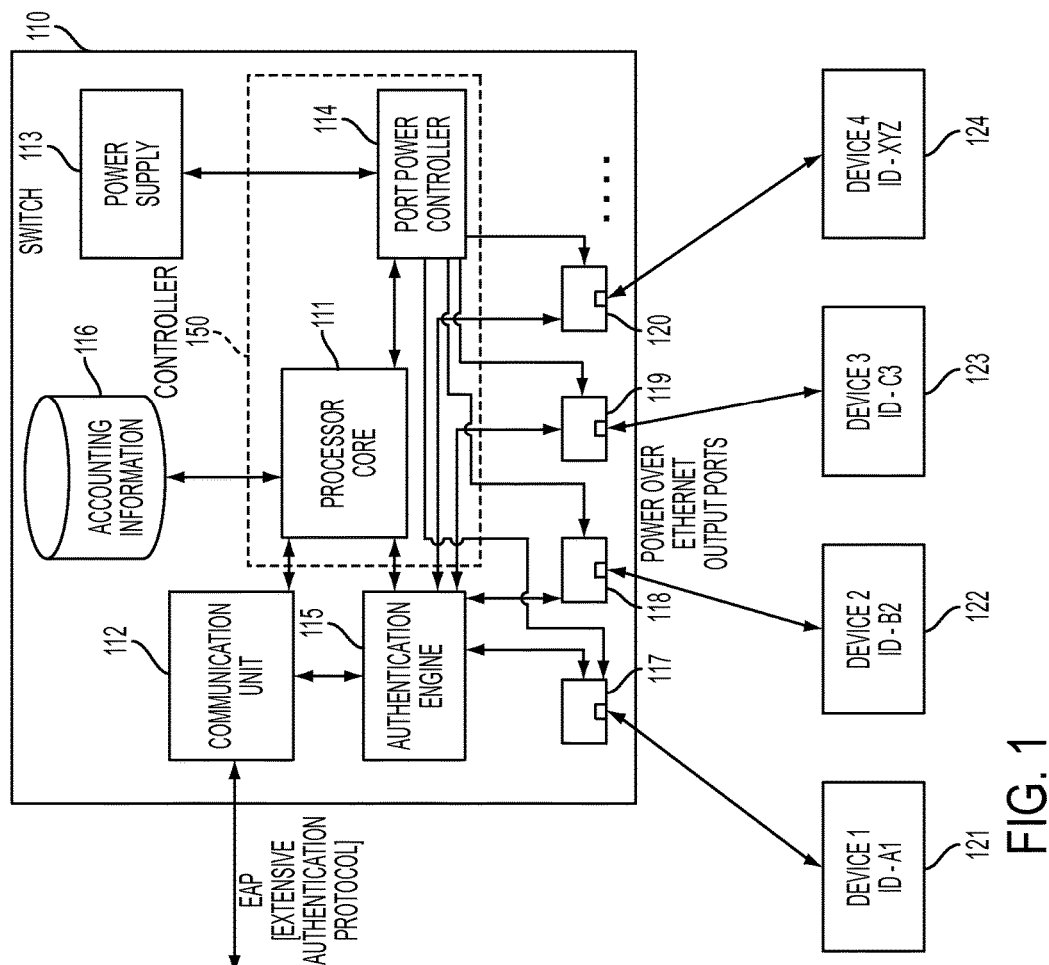
FIG. 1 illustrates an overview of a system depicting communication between a Power-over-Ethernet (PoE) switch, a remote authentication server and a plurality of electronic devices according to an example embodiment.

FIG. 1 illustrates a Switch 110, a Remote Authentication Server 100, and Electronic Devices 121-124 according to an example embodiment.

As illustrated, the Switch 110 includes a Processor Core 111, a Communication Unit 112, a Power Supply 113, a Port Power Controller 114, an Authentication Engine 115, an Accounting Information 116 and PoE Output Ports 117-120, according to an example embodiment. The number of PoE output ports on the Switch 110 vary, according to another example embodiment. The Port Power Controller 114 and the Processor Core 111 may be understood, in a more general sense, to constitute a Controller 150.

Figure 3:
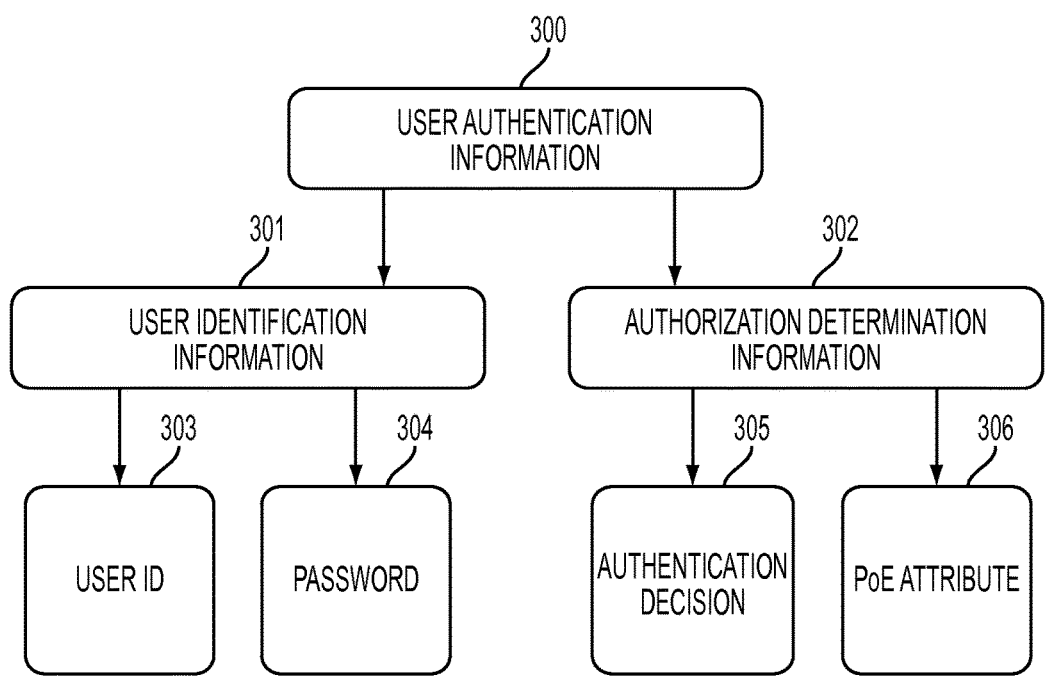
FIG. 3 illustrates a hierarchy of terms relating to user authentication information according to an example embodiment.

The Remote Authentication Engine 100 includes a Database 101 that stores User Authentication Information 300, in an embodiment. Reference is now made to FIG. 3, which illustrates a hierarchy of terms used in this discussion related to User Authentication Information 300. At the top of the hierarchy is the User Authentication Information 300. User Authentication Information 300 generally refers to any information supplied by the user to support an authentication process, as well as any information supplied or returned as a consequence of the authentication process. The User Authentication Information 300, in an example embodiment, is subdivided into 2 general categories, namely User Identification Information 301 and Authentication Determination Information 302.

The User Identification Information 301 relates to information supplied by the user in an attempt to become an authenticated user. This includes a User ID 303, Password 304, or other forms of identification information, known to those familiar with this field, such as biometric data or data supplied from a physical token or badge, in an embodiment.

The Authentication Determination Information 302 relates to information supplied in response to an authentication attempt. This includes an Authentication Decision 305, one or more PoE attributes 306 and any other attributes/ information required for the supply of data, power or working of the Switch 110, in an embodiment. For example, when the Authentication Decision 305 is in the affirmative, the user is an authenticated user. Similarly, when the Authentication Decision 305 is in the negative, the user is not an authenticated user.

Returning to FIG. 1, the PoE Attributes 306, for example, include PoE Attribute 1 and/or PoE Attribute 2, both shown in Database 101. This number of PoE Attributes 306 is provided as an example. The PoE Attributes 306 are supplied in response to the above mentioned user authentication attempt. The PoE Attribute 1, for example, indicates the level of power to be supplied to a particular user once authenticated. PoE Attribute 2, for example, indicates whether power is to be supplied at all to a user, or in another embodiment indicates whether the tracking of Accounting Information 116 for a given user is to be performed. Other PoE attributes will occur to those familiar with this field, and are within the scope and spirit of the inventive concept.

In FIG. 1, the Electronic Devices 121-124 are connected to the PoE Output Ports PoE Output Ports 117-120, according to an example embodiment. The Electronic Devices 121-124 include any suitable electronic devices that are PoE compatible.

In an example embodiment, the Processor Core 111 receives the User Identification Information 301 from the user using a PoE compatible electronic device connected to one of the PoE Output Ports 117-120. The Processor Core 111 receives this information via the Authentication Engine 115, or via the Port Power Controller 114, or both, depending on the specific implementation. In an embodiment, the Processor Core 111 communicates the received User Identification Information 301 with the Remote Authentication Server 100 using the Communication Unit 112. The Processor Core 111 subsequently authenticates the User Identification Information 301, received from the Electronic Devices 121-124, using the Network Port Authentication Protocol. In an example embodiment, the Network Port Authentication Protocol is IEEE 802.1x, an Extensible Authentication Protocol (EAP) or any other suitable higher layer network authentication protocol. The Network Port Authentication Protocol is a higher level network protocol ensuring access by authenticated users, who have one or more electronic devices. In an embodiment, the Processor Core 111 receives the Authentication Determination Information 302, which includes Authentication Decision 305 and PoE Attribute 306, for example, from a Database 101 stored in the Remote Authentication Server 100, via the Communication Unit 112. In addition, the Processor Core 111 receives, in an embodiment, information regarding the power related requirements of the Electronic Devices 121-124 connected to the PoE Output Ports 117-120. The Processor Core 111 receives Authentication Determination Information 302, for example, through the Authentication Engine 115 or through the Port Power Controller 114 and generates a configuration instruction based on this information to direct the Port Power Controller 114 to distribute power from the Power Supply 113 among the PoE Output Ports 117-120. In some embodiments, the Processor Core 111 also generates configuration instructions based on the information regarding the power related requirements of the Electronic Devices 121-124.

In an embodiment, Processor Core 111 directs the Port Power Controller 114 to stop the supply of power to one of the PoE Output Ports 117-120 when the Authentication Decision 305 is not affirmative, namely, that a device coupled to one of PoE Output Ports 117-120 is not authorized to receive power over a network connection. Conversely, when the Authentication Decision 305 is affirmative, the Processor Core 111 directs the Port Power Controller 114 to supply power to the PoE Output Ports 117-120 based on the PoE Attribute 306. In an example embodiment, the PoE Attribute 306 is one of high power, medium power, and low power. Additionally, in an embodiment, the Processor Core 111 supplies power usage information, received from the PoE Output Ports 117-120, to the Accounting Information 116. In the example of FIG. 1, the Processor Core 111 receives stored/logged power usage information from the Accounting Information 116. This power usage information is passed on to the Remote Authentication Server 100 via the Communication Unit 112, or otherwise suitably used for accounting and/or governing power delivered over PoE Output Ports 117-120.

In another example embodiment, the Processor Core 111 directs the Port Power Controller 114 to stop the supply of power to one of the PoE Output Ports 117-120, when the Authentication Decision 305 is not affirmative, for a predetermined period of time.

In yet another example embodiment, the PoE Attribute is a percentage of maximum possible power output to one of the PoE Output Ports 117-120.

The Port Power Controller 114 receives User Identification Information 301 from the user, who inputs the User Identification Information 301 using a PoE compatible electronic device connected to the PoE Output Ports 117-120. The Port Power Controller 114 passes the User Identification Information 301 to the Processor Core 111 to carry out the authentication process using the Network Port Authentication Protocol. As previously mentioned, the Network Port Authentication Protocol is an IEEE 802.1x, an Extensible Authentication Protocol (EAP) or any other suitable higher layer network authentication protocol, in an embodiment. The Port Power Controller 114 receives configuration instruction from the Processor Core 111 directing it to distribute power from the Power Supply 113 to the PoE Output Ports 117-120. The configuration instructions direct the Port Power Controller 114 to stop the supply of power to a particular PoE output port. In an example embodiment, the Port Power Controller 114 selectively stops the supply of power to a particular PoE output port. In another embodiment, Port Power Controller 114 additionally directs the Power Supply 113 to stop the supply of power for a predetermined period of time. The configuration instructions direct the Port Power Controller 114 to supply power to the PoE Output Ports 117-120 based on the PoE Attribute 306. The PoE Attribute 306 is one of high power, medium power, and low power, in an embodiment. In another example embodiment, the PoE Attribute 306 is a percentage value of the maximum possible power output to one of PoE Output Ports 117-120. The configuration instructions also direct the Port Power Controller 114 to supply power to the PoE Output Ports 117-120 based on the power related requirement of the Electronic Devices 121-124.

In an embodiment, the Authentication Engine 115 receives User Identification Information 301 from the user, who inputs the User Identification Information 301 using a PoE compatible electronic devices connected to the PoE Output Ports 117-120. The user provides User Identification Information 301 by inputting User ID 303 and Password 304 or other forms of identification information, known to those familiar with this field, such as biometric data or data supplied from a physical token or badge, in a prompt on the electronic device. The Authentication Engine 115 passes the User Identification Information 301 to the Processor Core 111 to carry out the authentication process using the Network Port Authentication Protocol. The Authentication Engine 115 also carries out the authentication process itself using the Network Port Authentication Protocol, in an embodiment. The Network Port Authentication Protocol is an IEEE 802.1x, an Extensible Authentication Protocol (EAP) or any other suitable higher layer network authentication protocol, in an embodiment. Upon receipt of User Identification Information 301, the Authentication Engine 115 communicates with the Remote Authentication Server 100 using the Communication Unit 112 to authenticate the User Identification Information 301. The Authentication Engine 115 receives the Authentication Determination Information 302, which includes Authentication Decision 305 and PoE Attribute 306, from the Database 101 stored in the Remote Authentication Server 100, via the Communication Unit 112. The Authentication Engine 115 supplies data to the PoE Output Ports 117-120 based on the Authentication Decision 305 and selectively passes the Authentication Decision 305 and PoE Attribute 306 to the Processor Core 111.

The Communication Unit 112 receives communication requests from the Authentication Engine 115 to communicate User Identification Information 301 to the Remote Authentication Server 100, in an example embodiment. The Communication Unit 112 also receives a communication request from the Processor Core 111 to communicate User Identification Information 301 to the Remote Authentication Server 100. The Communication Unit 112 communicates the User Identification Information 301 to the Remote Authentication Server 100. The Communication Unit 112 receives a communication request from the Processor Core 111 to communicate power usage information to the Remote Authentication Server 100. The Communication Unit 112 communicates power usage information to the Remote Authentication Server 100. The communication unit receives Authentication Determination Information 302 from the Remote Authentication Server 100 which it communicates to the Processor Core 111 and/or the Authentication Engine 115. The communication between Communication Unit 112 and Remote Authentication Server 100 takes place using Extensible Authentication Protocol (EAP), in an embodiment.

The Accounting Information 116 receives power usage information from the Processor Core 111. The Accounting Information 116 stores the power usage information on a per-user basis, a per-session basis, a per-device basis, and/or a per PoE Output Port basis, in an embodiment. The Accounting Information 116 sends the stored/logged power usage information to the Processor Core 111 to be communicated to the Remote Authentication Server 100, via the Communication Unit 112.

In the example seen in FIG. 1, the Power Supply 113 supplies power to the Port Power Controller 114 to be further distributed based on the Authentication Determination Information 302. The Power Supply 113 is directed by the Port Power Controller 114 to stop the supply of power for a predetermined period of time. Detailed explanation of the hierarchy of attributes is provided below with reference to FIG. 3.

The PoE Output Ports 117-120, which are operative to supply power to PoE compatible devices, are powered by the power supplied from the Power Supply 113. That is, power is distributed by the Port Power Controller 114 based on the Authentication Determination Information 302, in an example embodiment. In connection with this function, the Switch 110 is IEEE 802.3af compliant, in an example embodiment. The compliance with the IEEE standards ensures that only PoE enabled devices can couple to the PoE Output Ports 117-120.

Figure 2:
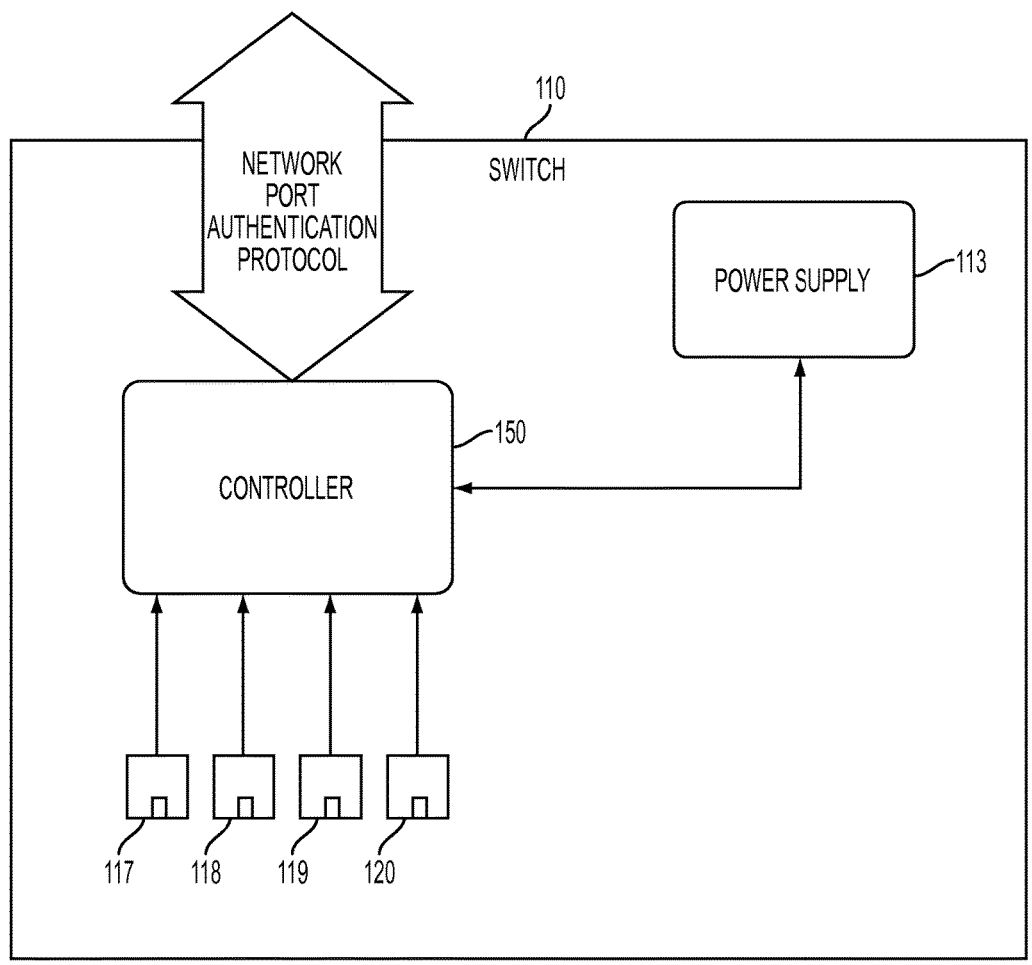
FIG. 2 illustrates a PoE switch configured to selectively control the supply of power to the PoE output ports based on the network port authentication protocol according to an example embodiment.

FIG. 2 illustrates a Switch 110 according to another example embodiment. The embodiment depicted in FIG. 2 differs from that of FIG. 1 in that the embodiment of FIG. 2 depicts multiple functions being implemented by one control unit, namely, the Controller 150. In this example embodiment, the relevant functionalities of the Processor Core 111 and the Port Power Controller 114 are included in a single logical block, a Controller 150. In contrast, the embodiment in FIG. 1 shows an example of the implementation of multiple functions in a conceptually separate manner. These embodiments are by no means meant to be restrictive or limitative, and depict only two specific implementations by which the inventive concept can be implemented.

As illustrated in FIG. 2, the Switch 110 includes a Controller 150 which distributes power to the PoE Output Ports 117-120, in response to a Network Port Authentication Protocol.

In the example embodiment shown in FIG. 2, the Controller 150 receives User Identification Information 301 from the user, who inputs the User Identification Information 301 using, e.g., a user interface of a PoE compatible electronic device coupled to the PoE Output Ports 117-120.

The Controller 150 authenticates the User Identification Information 301 received from the user using the Network Port Authentication Protocol. In an example embodiment, the Network Port Authentication Protocol is an IEEE 802.1x, an Extensible Authentication Protocol (EAP) or any other suitable higher layer network authentication protocol. The Network Port Authentication Protocol is a higher level network protocol ensuring access by authenticated users, who has one or more electronic devices. The PoE Output Ports 117-120 are powered by the power supplied from the Power Supply 113 and distributed by the Controller 150 in response to the Network Port Authentication Protocol, in an embodiment.

Figure 4:
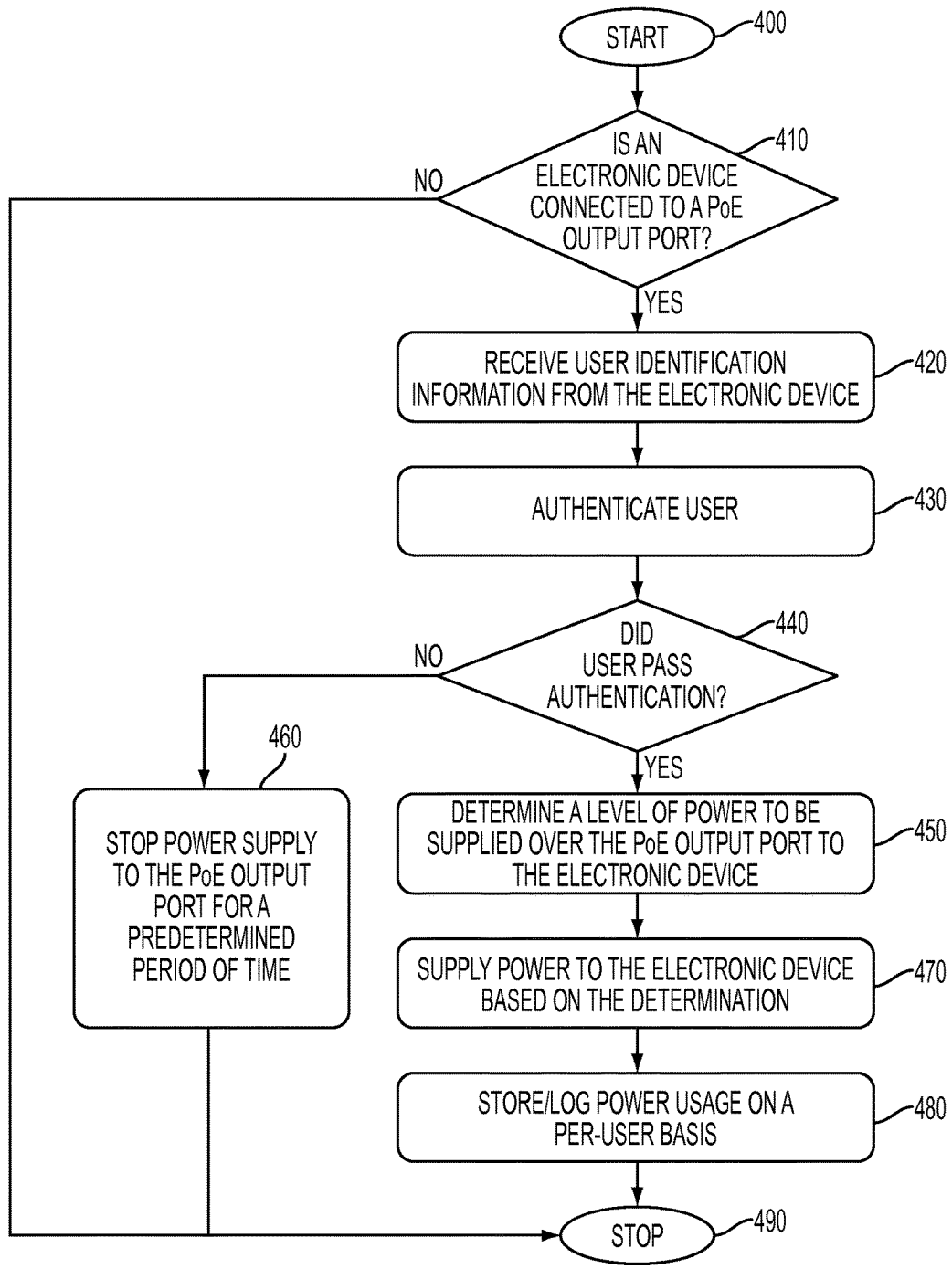
FIG. 4 illustrates a flow chart depicting the process of user authentication and distribution of power over the PoE output ports to the electronic devices according to an example embodiment.

FIG. 4 illustrates a flowchart describing one method of supplying power to one PoE output port in an example embodiment. The processing begins with step 400. In step 410, the Switch 110 checks to see whether a suitable PoE enabled electronic device 121-124 has been connected to any of the PoE Output Ports 117-120. If no PoE enabled electronic device 121-124 is connected, processing continues to the end at step 490. If an electronic device 121-124 is connected, processing continues at step 420. In step 420, User Identification Information 301 is received from the electronic device. Afterward, using higher layer network protocols, such as an IEEE 802.1x or an Extensible Authentication Protocol (EAP), the Switch 110 authenticates the user in step 430. The authentication step has already been described, above, with respect to a Remote Authentication Server 100, in an example embodiment.

When an Authentication Determination Information 302 is received by the Switch 110, the determination is made in step 440 as to whether the user successfully passed authentication. In the event that the user did not pass authentication (i.e., the Authentication Determination Information 302 is in the negative), processing continues to step 460 in which the power supply to the PoE output port to which the device is connected is be stopped. In an example embodiment, the stoppage of the power is for a predetermined period of time. If the user did pass authentication in step 440 (i.e., the Authentication Determination Information 302 is in the affirmative), processing continues instead at step 450.

In step 450, the Switch 110 determines, e.g., a level of power to be supplied over the PoE output port to the electronic device. This determination, for example, is based on what is indicated by one or more PoE Attributes 306 as indicated for the corresponding holder of the User ID 303 and Password 304, according to the Database 101 in this example.

Following that, the Switch 110 supplies power to the electronic device in step 470 based on the determination made in step 450. In an example embodiment, the Switch 110 simultaneously starts storing/logging power usage information on a per-user basis in step 480. In another example embodiment, the power usage is stored/logged on a per-device basis. In yet another example embodiment, the power usage is stored/logged on a per-session basis. The processing continues to the end at step 490.

In a non-limiting example embodiment, the Database 101 contains two PoE Attributes 306 per user. The first PoE attribute holds a value of one of high power, medium power and low power, for example. The second PoE attribute holds a value of on and off.

The Database 101 further contains a set of User IDs and Passwords of authorized users along with their specific PoE attribute values. In another example embodiment, when the User Identification Information 301 supplied via an electronic device such as Device 4 (see reference numeral 124 in FIG. 1) does not match the information stored in the Database 101, a default value for unauthenticated users is applied (see ID Other in Database 101). In another example embodiment, for such unauthenticated users, the Switch 110 stops the supply of power to the PoE output port. In another exemplary embodiment, the stoppage is for a predetermined period of time.

If the User Identification Information 301 is authenticated, the Switch 110 uses the PoE attributes to determine a level of power to be supplied to the electronic device. The determination is also based on the power related requirement of the electronic device, in an embodiment. For example, assume that a user of electronic device 122 (Device 2 in FIG. 1) has provided the UserID 303 of "B2" and the Password 304 of "xyz345," and an affirmative Authentication Determination Information 302 has subsequently been received at the switch, together with PoE Attributes 306 as shown in Database 101. When the first PoE attribute is set to "high" and the second PoE attribute is set to "on", the Switch 110 supplies a high level of power to the PoE port where the electronic device is connected. For instances in which the second PoE attribute is off, however, as in the example mentioned above with respect to an unauthenticated user, the Switch 110 provides no power at all, forcing the user to rely on their own, independent power source.

Figure 5:
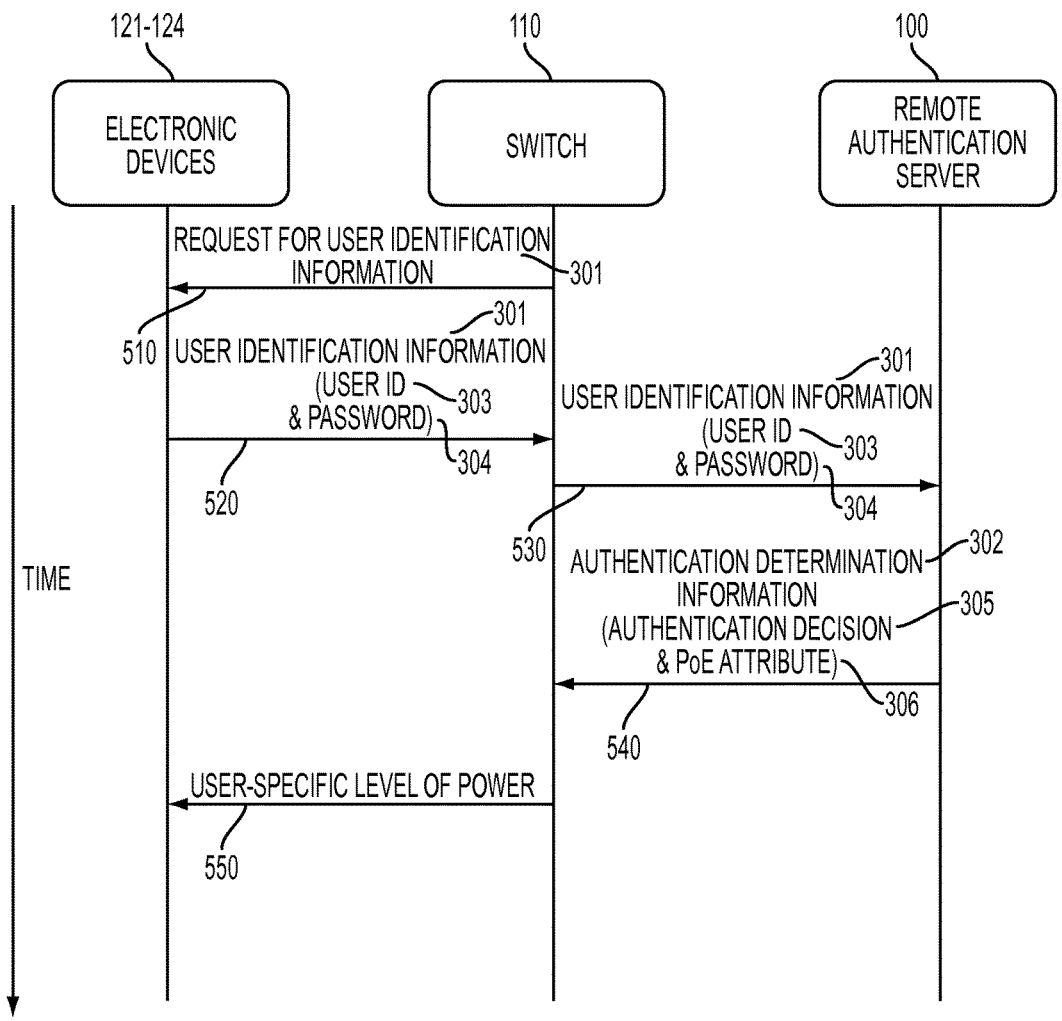
FIG. 5 illustrates the flow of user information between the electronic device, the switch and the remote authentication server over a timeline according to an example embodiment.

FIG. 5 illustrates a flow of user information between the Electronic Devices 121-124, the Switch 110 and the Remote Authentication Server 100 over a timeline, according to an example embodiment. The Switch 110 sends a request 510 for the User Identification Information 301 via the PoE Output Ports 117-120 to one of the Electronic Devices 121-124. The Electronic Devices 121-124 provide 520 the Switch 110 with the User Identification Information 301, which further includes the User ID 303 and the Password 304. The Switch 110 passes that information 530 to the Remote Authentication Server 100 to implement the authentication process. The Remote Authentication Server 100 supplies a response 540 the Switch 110 with Authentication Determination Information 302, which further includes Authentication Decision 305 and PoE Attribute 306. After receiving the Authentication Determination Information 302, the Switch 110 supplies a user-specific level of power 550 to one of the Electronic Devices 121-124 based on the Authentication Decision 305, and the PoE Attribute 306.

In another example embodiment, the Switch 110 receives the User Identification Information 301 without sending any request to the Electronic Devices 121-124.

To summarize, the present PoE standards do not provide for any user-specific power management function, but, rather, provide detailed requirements for PoE devices, and how suitable devices can be identified so that they can receive a power supply over an Ethernet Connection. Storing PoE Attributes 306 in association with user-specific information makes it possible to configure and track power provided to electronic devices based on the user's identity, where the user is using one or even more electronic devices, as indicated by User Identification Information 301.

The user-specific power management function need not be implemented as shown in either FIG. 1 or 2. In an example embodiment, the Database 101 is provided in the Switch 110 thus not requiring a Remote Authentication Server 100 to implement user-specific power management.

In another example embodiment, the Database 101 is provided in two parts with some of the information being provided in the Remote Authentication Server 100 and part in the Switch 110. In this instance, the Switch 110 could store PoE Attribute information in association with certain user-specific information, without the need for the Switch 110 to take any role in authenticating users.

In another example embodiment, Authentication Determination Information 302 includes attributes providing power plan information for a given user, having one or more electronic devices. The power plan information includes the number of devices allowed on the network, in an embodiment. This attribute is used to make sure that the user is not using power for more than the authorized number of devices on the network In another example embodiment, the power plan information includes the amount of allotted quantity or power per-user. This attribute is used to make sure the user has not exceeded the allotted quantity of power.

In an example embodiment discussed above, configuration instructions were used to direct the Port Power Controller 114 to stop the supply of power. Alternative embodiments are also possible. For example, instead of stopping the supply of power altogether, the instructions might set it to a uniform base level of power until a user using a given port is authorized. In still another example, a uniform level of power is supplied only to authenticated ports. In yet another example, different levels of power are supplied depending on the PoE attributes. Other desirable schemes for user-specific power management will occur to those familiar with this field.

The logging and storing of Accounting Information 116 also provides for further example embodiments relating to tracking power use on a user-specific basis. For example, users might be charged for power used when receiving PoE power. Users, likewise, might be subjected to ceilings on power usage beyond which charging might occur, or beyond which further power is not supplied.

Furthermore, the information stored inside the Accounting Information 116 may be concretely implemented in a number of different example embodiments. In one example embodiment, the Accounting Information 116 is stored as a database. Another example embodiment stores the Accounting Information 116 in the form of tables in a memory, or other forms understood by those familiar with this field. In an example embodiment, the power usage data is stored on a per-device basis but is also associated with a particular user so as to facilitate implementation of a power plan as previously mentioned.

Although well understood by those familiar with this field, the Port Power Controller 114, the Processor Core 111, and any other functions illustrated in FIGS. 1 and 2 can be implemented by hardware such as an ASIC or as a general purpose processor core. In the case of a general purpose processor core, the hardware can be enabled to implement the various functions or operations by way of computer readable instructions stored on a computer readable medium. Such a computer readable medium can be realized as a non-transitory computer readable medium such as ROM, RAM, or any other storage medium used today or implemented in the future. By loading instructions from the computer readable medium into a hardware processor core, and executing the instructions, such a general purpose processor core is enabled to carry out one or more of the functions and operations described and shown herein. Multiple processor cores or ASICs can be used to implement one or more functions, according to sound engineering and design principles.

Although the inventive concept has been described above with respect to the various embodiments, it is noted that there can be a variety of permutations and modifications of the described features by those who are familiar with this field, only some of which have been presented above, without departing from the technical ideas and scope of the features, which is defined by the appended claims.

Further, while this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

Although the drawings describe operations in a specific order and/or show specific arrangements of components, and are described in the context of access segments of data centers, one should not interpret that such specific order and/or arrangements are limited, or that all the operations performed and the components disclosed are needed to obtain a desired result. There are numerous hardware and software devices that can be configured to forward packets, transmit various address resolution messages, update address caches and packet addresses in the manner described in the present disclosure with respect to various embodiments. Accordingly, other implementations are within the scope of the following claims.

There is claimed:

1. A switch, comprising:
a plurality of power over Ethernet (PoE) output ports, including a first PoE output port and a second PoE output port; and
a controller, coupled to the plurality of PoE output ports, and responsive to a network authentication protocol for authenticating a user, the controller being configured to selectively control the plurality of PoE output ports to provide a first level of power to a first device coupled to the first PoE output port, and to provide a second level of power, to a second device coupled to the second PoE output port in response to an authentication of the user according to the network authentication protocol and a PoE attribute specific to the user and different from at least one PoE attribute specific to another user which the controller is further configured to authenticate, wherein
the first level of power is different from the second level of power, and
the PoE attribute specific to the user indicates the second level of power.

2. The switch according to claim 1, further comprising:
a power supply;
wherein the controller includes:
a processor core configured to generate a configuration instruction based on user authentication information, authenticated via the network authentication protocol; and
a port power controller configured to distribute power from the power supply among the plurality of PoE output ports in accordance with the configuration instruction from the processor core.

3. The switch according to claim 2, further comprising a communication unit configured to communicate the user authentication information to an external server using Extensible Authentication Protocol (EAP).

4. The switch according to claim 2, further comprising:
an authentication engine;
wherein: the processor core is configured to process the user authentication information, including the PoE attribute, received from the authentication engine; and
the processor core is configured to generate the configuration instruction based on the PoE attribute.

5. The switch according to claim 2, wherein:
the processor core is configured to generate the configuration instruction based also on a power-related requirement of the first device; and
the port power controller is configured to selectively provide the first level of power to the first device based on the power related requirement of the first device, and to selectively provide the second level of power to the second device based on the power related requirement of the second device.

6. The switch according to claim 2, wherein the processor core is configured to generate a configuration instruction that causes the port power controller to distribute power, from the power supply, to the plurality of PoE output ports, according to a prioritization scheme
that prioritizes providing power to those PoE output ports which are coupled to devices associated with an authorized user.

7. The switch according to claim 2, wherein:
the user authentication information includes an authentication decision; and
when a given port of the plurality of PoE output ports is receiving power and the authentication decision for the given port is not affirmative, the processor core generates a configuration instruction causing the port power controller to stop distributing power from the power supply to the given port.

8. The switch according to claim 1, wherein:
the controller is responsive to IEEE 802.1x network authentication protocol; and
the controller operates in compliance with IEEE 802.3af.

9. The switch according to claim 1, further comprising an accounting information unit configured to store power usage information on a per-user basis.

10. The switch according to claim 1, wherein the PoE attribute specific to the user further indicates whether power usage of the first user is to be tracked,
the PoE attribute specific to the another user indicates a power level to be supplied to the first device coupled to the first PoE output port and to the second device coupled to the second PoE output port, the power level being the different than the first level of power and the second level of power, and
the PoE attribute specific to the another user further indicating whether power usage of the second user is to be tracked.

11. A switch, comprising:
a plurality of power over Ethernet (PoE) output ports that are configured to supply power to a device that is coupled to one of the PoE output ports; and
a controller, that is responsive to a network authentication protocol for authenticating a user, coupled to the PoE output ports and configured to selectively control the supply of power to the PoE output ports in response to an authentication of the user according to the network authentication protocol and a PoE attribute specific to the user corresponding a first power level and different from at least one PoE attribute specific to another user corresponding to a second power level which the controller is further configured to authenticate, wherein
the first level of power is different from the second level of power, and
the PoE attribute specific to the user indicates the second level of power.

12. The switch according to claim 11, wherein the responsiveness of the controller to the network authentication protocol is implemented by the controller by responding to an instruction based on the network authentication protocol.

13. A method for providing a level of power from a Power over Ethernet (PoE) output port, the method comprising:
- detecting a connection of an electronic device at the PoE output port;
- receiving user identification information, comprising a PoE attribute specific to the user corresponding to a first power level and different from at least one PoE attribute specific to another user corresponding to a second power level, via the PoE output port, the another user being predetermined for authentication;
- authenticating the user based on the received user identification information;
- making a determination, as to a level of power to be supplied to the electronic device over the PoE output port, based on the authentication; and
- supplying power, from the PoE output port, to the electronic device, in response to the determination, wherein the first level of power is different from the second level of power;
- the PoE attribute specific to the user indicates the second level of power.

14. The method according to claim 13, wherein making the determination comprises authenticating a user associated with the electronic device by user identification information, and determining the level of power to be supplied taking into account an authentication decision based on the user identification information.

15. The method according to claim 14, wherein determining the level of power to be supplied over the PoE output port is based on the PoE attribute of the user identification information.

16. The method according to claim 14, wherein determining the level of power to be supplied over the PoE output port comprises determining the first level of power to be supplied to a first port and determining the second level of power, different from the first level of power, to be supplied to a second port,
the second level of power being indicated by the PoE attribute specific to the user.

17. The method according to claim 14, wherein, when the authentication decision is not affirmative, the level of power supplied to the PoE output port is substantially no power.

18. The method according to claim 13, further comprising making a record of power provided over the PoE output port, in accordance with the user identification information so that power usage records are made on a per-user basis.

* * * * *